United States Patent [19]

Mutoh et al.

[11] Patent Number: 5,247,619
[45] Date of Patent: Sep. 21, 1993

[54] INSERTION AND REMOVAL OF A CIRCUIT DEVICE INTO A BUS NETWORK

[75] Inventors: Yasushi Mutoh; Masakazu Okada; Shozi Yamaguchi; Kunio Suzuki, all of Hitachi, Japan

[73] Assignees: Hitachi, Ltd., Tokyo; Hitachi Process Computer Engineering, Inc., Ibaraki, both of Japan

[21] Appl. No.: 375,826

[22] Filed: Jul. 5, 1989

[30] Foreign Application Priority Data

Jul. 12, 1988 [JP] Japan ............................ 63-171779

[51] Int. Cl.⁵ .............................................. G06F 13/14
[52] U.S. Cl. ................................. 395/325; 364/DIG. 2; 364/927.93; 364/929.4; 364/935.41; 364/935.42; 361/785

[58] Field of Search ... 364/200 MS File, 900 MS File; 361/407, 409, 412, 399, 413; 395/275, 325, 725

[56] References Cited

U.S. PATENT DOCUMENTS

| | | | |
|---|---|---|---|
| 4,562,535 | 12/1985 | Vincent et al. | 364/200 |
| 4,609,829 | 9/1986 | Milby et al. | 361/407 |
| 4,635,192 | 1/1987 | Ceccon et al. | 364/200 |
| 4,704,599 | 11/1987 | Kimmel et al. | 361/413 |

FOREIGN PATENT DOCUMENTS

0241905 10/1987 European Pat. Off. .
0254456 1/1988 European Pat. Off. .

*Primary Examiner*—Debra A. Chun
*Attorney, Agent, or Firm*—Antonelli, Terry, Stout & Kraus

28 Claims, 11 Drawing Sheets

INSERTION AND REMOVAL OF A CIRCUIT DEVICE INTO A BUS NETWORK

BACKGROUND OF THE INVENTION

The present invention relates to the insertion and removal of a circuit device into and from a bus network. It is particularly, but not exclusively, concerned with the case where that circuit device is a printed circuit board.

Figure 1:
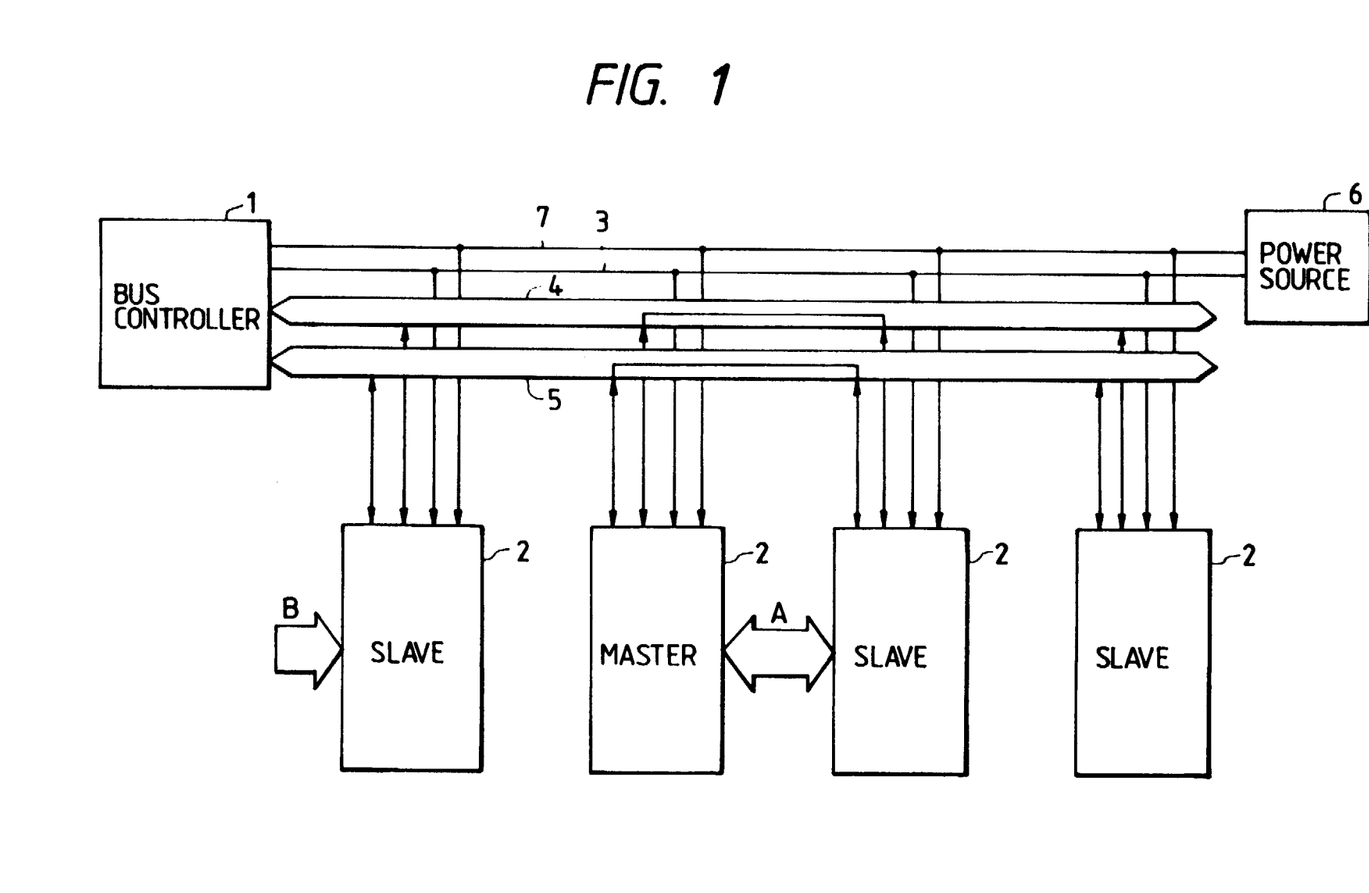
FIG. 1 shows a plurality of circuit components interconnected by a bus network.

It is well known to interconnect circuit devices by means of a bus network which enables the devices to signal one to the other. FIG. 1 of the accompanying drawings shows a schematic block diagram of such an arrangement, in which a plurality of circuit devices 2 are interconnected with each other and are connected to a bus controller via a bus. That bus comprises an address and/or data bus (communication bus) 5, a control bus 4, and power buses 3,7 connected to a power source 6. One of the circuit devices 2 is a master, which controls the other circuit devices 2 which act as slaves. When the master circuit device 2 wishes to signal to one of the slave circuit devices 2, the master circuit device signals to that slave, and to the bus controller, via the control bus 4, and then data can be passed between master and slave along the address and data bus 5 as indicated by arrow A. The bus controller 1 ensures that the signalling is controlled in the desired way.

However, it sometimes occurs that there is a failure in one of the components of the circuit, and then the appropriate circuit device 2 must be removed and replaced. Where it is the master circuit device that is removed, there is normally no problem since the removal of that device effectively stops the network operation. However, when a slave circuit device is to be removed, the situation is more complicated. It is normally not desired to shut-down the network completely before removal of any particular slave circuit device, and therefore the faulty circuit device must be removed while the system remains under power. If one of the circuit devices 2, e.g. that indicated by arrow B is removed, then it is found that there is a risk that transient signals generated when it is removed affect data which is being transmitted between the master and another of the slave devices. The present invention, therefore, is concerned with trying to overcome this problem, while permitting insertion or withdrawal of a circuit device when the system is on-line (i.e. without disconnecting the power source) rather than by complete shut-down of the network.

U.S. Pat. No. 4,079,440 proposes a system in which each circuit device is mounted on a printed circuit board, and the board has at least two connector plugs for connecting it to the power supply, with those plugs being of different lengths. Therefore, during insertion and removal, the time of contact with the power line of those two connector plugs is different, and this difference can be used to decrease fluctuations of the power source voltage during insertion and removal. However, this is only a limited solution to the problem, since it does not resolve all the causes of faulty signalling.

U.S. Pat. No. 4,200,865 discloses an arrangement in which the circuit devices are mounted on a printed circuit board for insertion into a bus network, and the circuit board is designed so that the input to or the output from the board can be locked in response to the presence of two conditions, namely the application of a request for removal or insertion, and the fact that the circuit device is not signalling to any other device. In this system, the circuit components of the circuit device are connected to an address bus via an output driver, and the aim of the invention of this patent is to lock that bus driver to prevent the bus line from being electrically disturbed.

However, it has been discovered that the arrangement of U.S. Pat. No. 4,200,865 has a problem. At the time the circuit device is inserted or removed, the power connection to the output driver is disconnected, and therefore its locking is no longer stable. As a result, during transient conditions at the time of insertion or removal of the circuit device, the output driver may become unlocked and, depending on the electronic conditions present elsewhere in the circuit device, the circuit device may again be free to transmit to the bus network, thereby causing faults within the signalling in that network.

SUMMARY OF THE INVENTION

The present invention seeks to overcome, or at least ameliorate, the problems of the prior art by reducing or eliminating the risk of faults in signalling when a circuit device (which may be mounted on a printed circuit board) is inserted into or removed from a bus network interconnecting a plurality of such devices.

In its most general form, the present invention proposes that, on insertion, the first step is for the circuit device to generate a signal which prevents the other circuit devices (which are under power) from signalling on the communication bus of the bus network, and then powering the output driver of the circuit device is effected. The signal is maintained until the output driver is stabilised, after which it can be removed. Similarly, on removal, a signal is supplied to the bus network to inhibit other circuit devices from transmitting, the power is removed from the output driver, the signal is maintained until the output driver is stable, and only then is the circuit device removed. To express this in another way, the invention proposes that, on insertion or removal, the circuit device to be inserted or removed "occupies" the bus until insertion or removal is complete.

Normally, the signalling described above will be controlled by a suitable control device in the circuit device. That control device controls the signalling to the bus network, and also controls the switching of power to the output driver in timed relationship with that signal.

It is normal for the power supply to the circuit devices to come from power buses of the bus network. In this case, the act of physically inserting or removing the circuit device connects both the control circuit and the output driver physically to the bus network, but the device is arranged so that only the control device (and possibly other circuit components, but not including the output driver), will be powered immediately on insertion. Then, the signal is generated to inhibit other devices from signalling on the communications bus, and then the output driver can be powered. Once the powering is stable, the circuit device may operate normally. On removal, the procedure is similar, with the powering of the control device remaining until the disconnection of the output driver is complete.

The present invention has a number of aspects. It is concerned with the method of removal of a circuit device from and insertion thereof into a bus network having a plurality of powered circuit devices, to a circuit network having a plurality of such circuit devices interconnected by a bus network, to a method of maintaining such a circuit network, to the circuit device itself and to a computer system incorporating the network.

With the present invention the bus network, and in particular the communication bus of that network, is not disturbed during insertion or removal of a circuit device, since the bus is effectively "occupied" by that device and other devices cannot signal on the bus during the insertion or removal operation. Occupation of the bus is released when the supply of power to the output driver is stabilised on disconnection and removal, and this enables the bus occupation time to be minimised.

BRIEF DESCRIPTION OF THE DRAWINGS

An embodiment of the invention will now be described in detail, by way of example, with reference to the accompanying drawings in which.

In the drawings corresponding parts are indicated by the same reference numerals.

DETAILED DESCRIPTION

Figure 2:
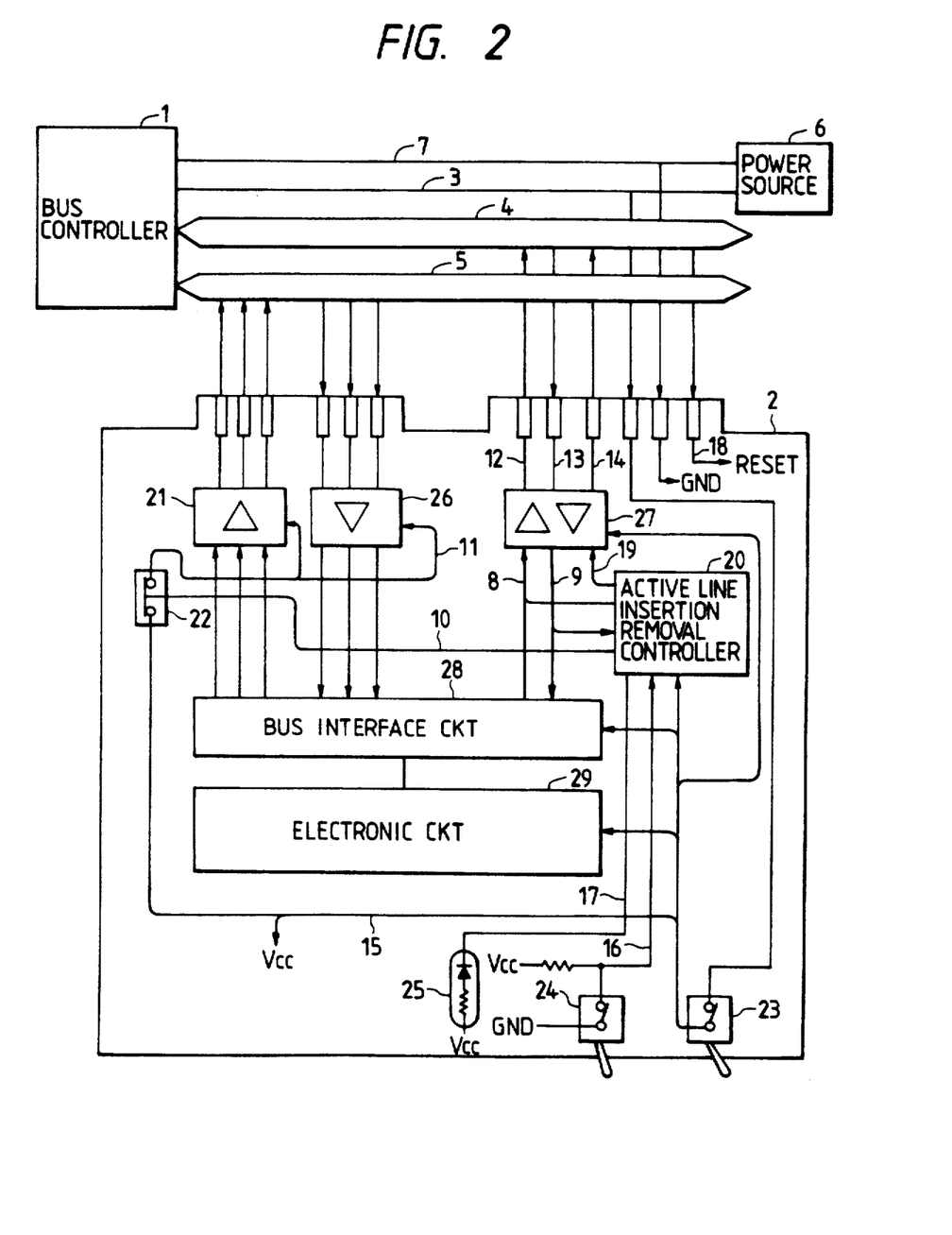
FIG. 2 shows a general schematic view of a circuit device according to the present invention connected to a bus network.

FIG. 2 illustrates the connection of a circuit device to a bus network. The bus network shown in FIG. 2 is the same as that in FIG. 1, and furthermore further circuit devices 2 may also be connected to the bus network in a similar manner to that illustrated in FIG. 1.

The circuit device 2 comprises an electronic circuit 29 which contains the circuit components which define the operation to be carried out by the device 2. That electronic circuit 29 is connected via an interface circuit 28 to an output driver (bus driver) 21, which in turn is connected to the address data bus (communications bus) 5. Thus, the electronic circuit 29 can signal via the interface circuit 28 and the bus driver 21 to the address-/data bus 5. Similarly, signals from other circuit devices transmitted on the address/data bus 5 may be received via an address/data receiver 26, which is connected to the interface circuit 28 and so permits those signals to be transmitted to the circuit 29.

The circuit device 2 is also connected to the control bus 4 via a bus access controller 27. Connected to that access controller 27 is an active line insertion/removal controller (control device) 20 which controls the operation of the circuit device 2 in a manner which will be described.

The circuit device 2 is connected to the power source 6 via power buses 3 and 7, and the signal from those power buses passes via a switch 23 to the control device 20, to the interface circuit 28, and to the circuit 29. In addition, that switch 23 passes power to the output driver 21 and to the data receiver 26, but interposed therebetween is a relay 22 controlled by the control device 20. A switch 24 is also connected to the control device 20, as is an LED (display) 25.

Figure 3:
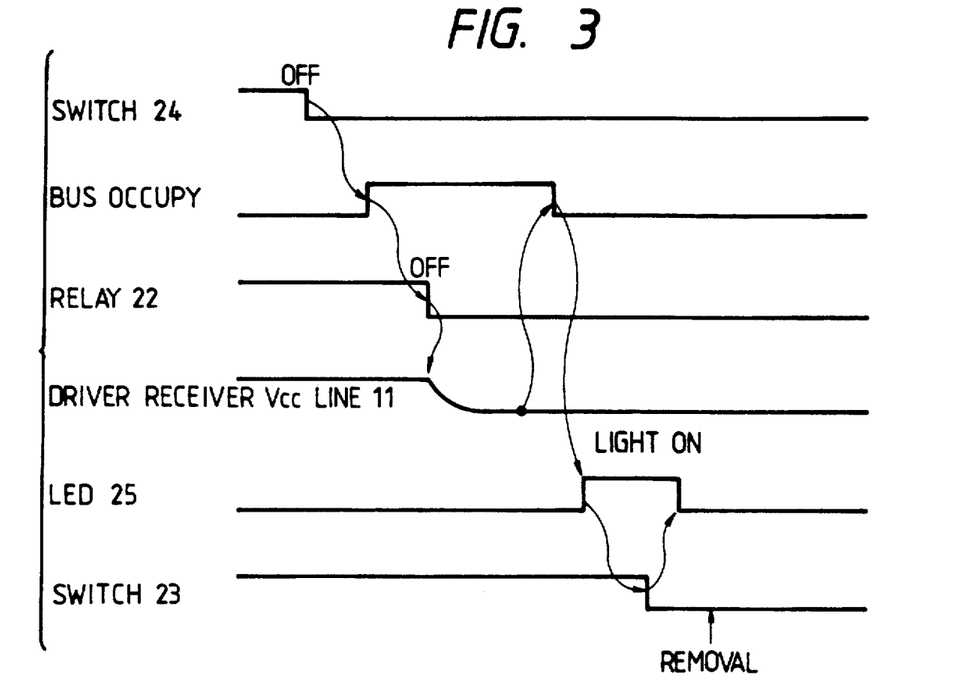
FIG. 3 shows the operation of the device of FIG. 2 during removal of that device from the network.

The operation of the circuit device of FIG. 2 will now be described, referring also to FIGS. 3 and 4, and the flowchart of FIGS. 5 and 6. Consider first the case where the circuit device 2 is to be removed from the bus network. The first stage of operation calls for the switch 24 to be opened, as shown in FIG. 3, to generate a signal via line 16 to the control device 20. That control device then generates a signal via line 8 to the access controller 27, which in turn generates a signal (bus request) via line 12 to the control bus 4. That bus request signal signals to the bus controller that the circuit device 2 to be removed is requesting to "occupy" the bus, i.e. that the circuit device 2 is to take control of the bus and other circuit devices connected to the bus network should not be permitted to transmit signals on the bus while it is occupied by circuit device 2.

On receipt of that signal, the bus controller determines a time when no other circuit device is signalling, and transmits a signal (bus request grant) via the control bus 4 which is received on line 13 by the access controller 27. It is this signal that indicates that the circuit device 2 to be removed "occupies" the bus. The signal is passed via line 9 to the control device 20. On receipt of this signal, the control device 20 generates a signal on line 10 which opens the relay 22 and so cuts off the power from the output driver 21 and the data receiver 26. Effectively, line 11 is disconnected from the power supply while power is still supplied to the other parts of the circuit device 2. At the same time, the control device 20 generate a signal (bus busy) which is fed via line 19, the access controller 27, and line 14 to the control bus 4 to inform the bus controller 1 that the bus is occupied.

Once the power has been removed from the output driver 21 (and the data receiver 26) there is a short time of the order of 1 $\mu$S to 100 $\mu$S when the operation of the output driver 21 is unstable. This time must elapse before any other change can be made.

It is possible for the control device 20 simply to wait for a predetermined time $t_1$, which is known to be longer than the unstable time of the output driver 21 before operating further. Alternatively, means (not shown) may be provided to detect the state of the output driver 21 and signal to the control device 20 when the output driver 21 is in a stable state (at zero power on removal).

After the output driver 21 becomes stable in the off state, the control device 20 removes the signal via lines 12 and 14 to the bus controller 1, thereby indicating that the device 2 no longer needs to occupy the data bus.

Once the circuit device 2 no longer occupies the line, the control device 20 generates a signal on line 17 to the LED 25, which is illuminated to show that the circuit device 2 is ready for removal. At that time, the switch 23 is opened to disconnect the control device 20, and the other parts of the circuit device 2 from the power supply, and then the circuit device 2 may be physically removed from the bus network.

Figure 5A:
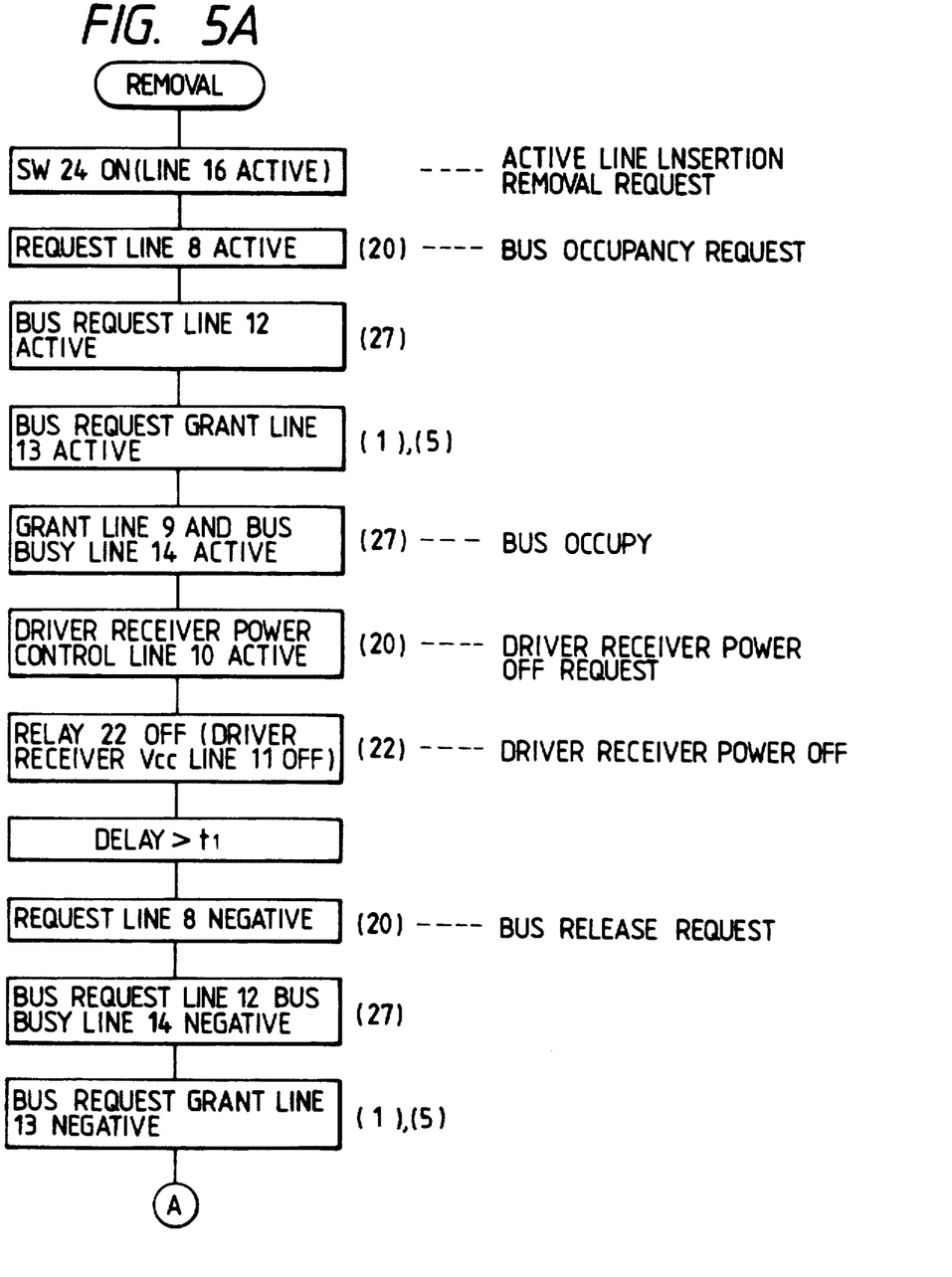
FIG. 5, consisting of FIGS. 5A and 5B, is a flow chart showing the steps during removal of the device of FIG. 2 from the bus network.
Figure 5B:
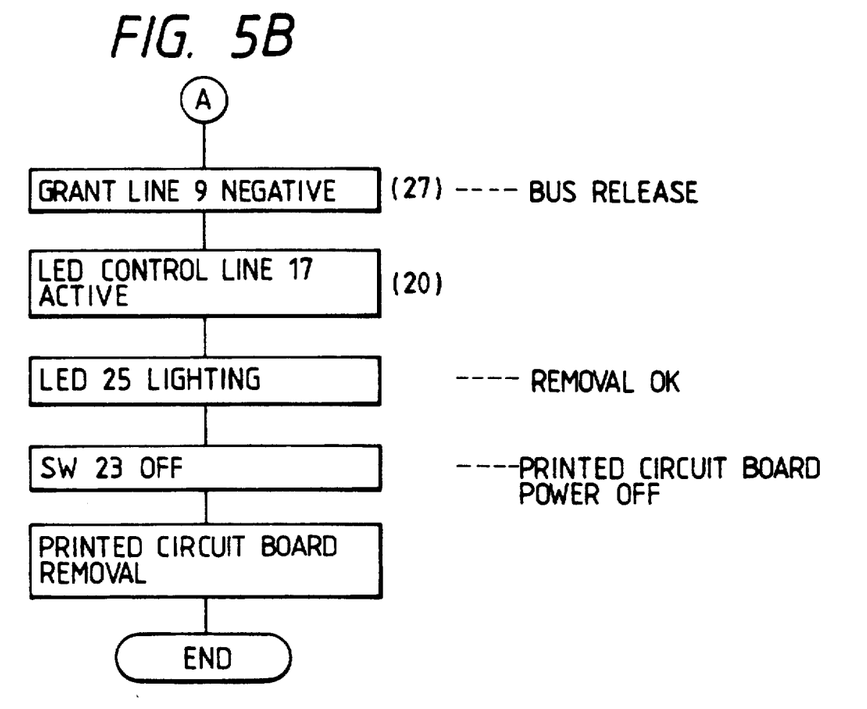
Figure 6A:
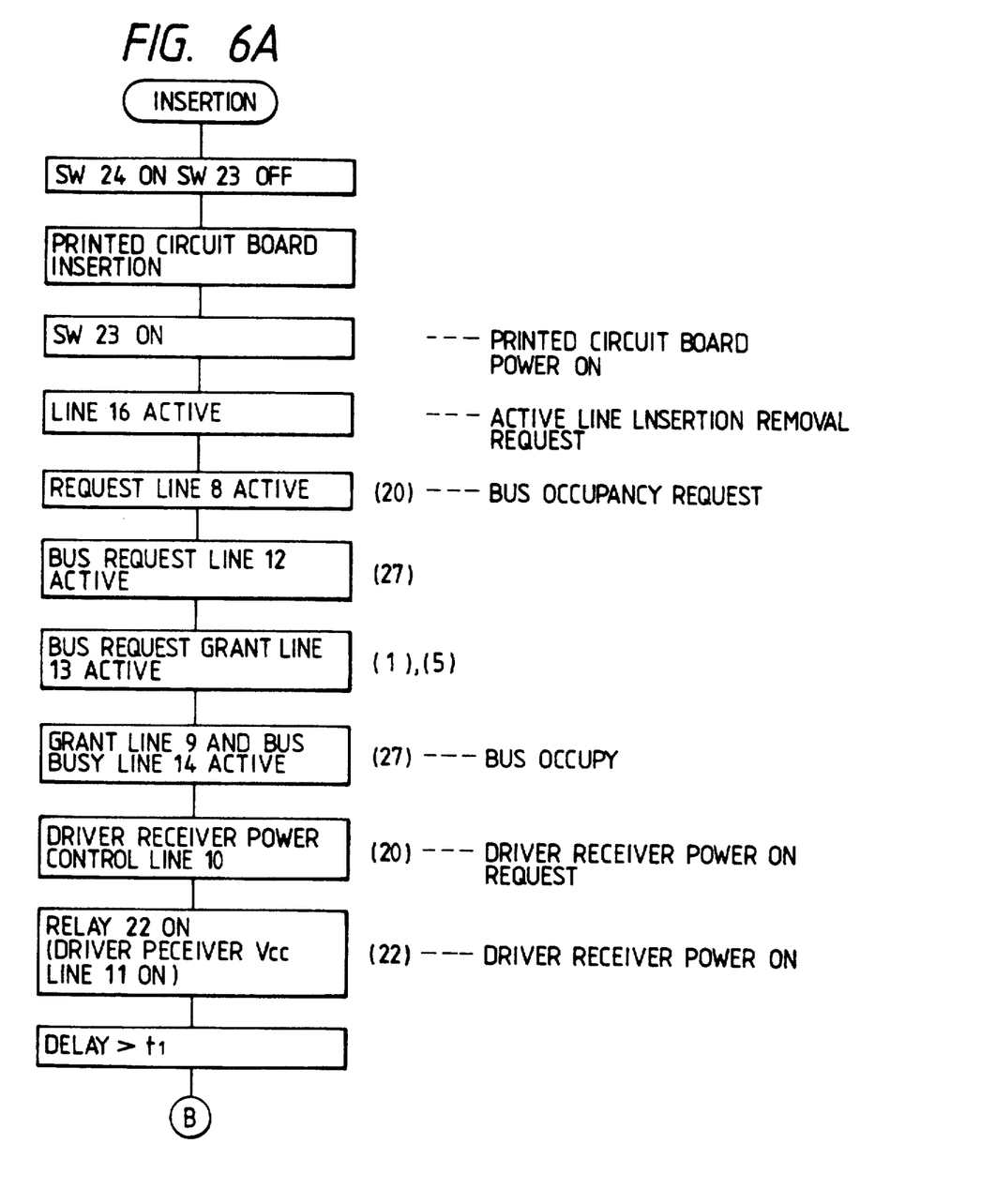
FIG. 6, consisting of FIGS. 6A and 6B, is a flow chart of the operations for insertion of the circuit device of FIG. 2 into the bus network.
Figure 6B:
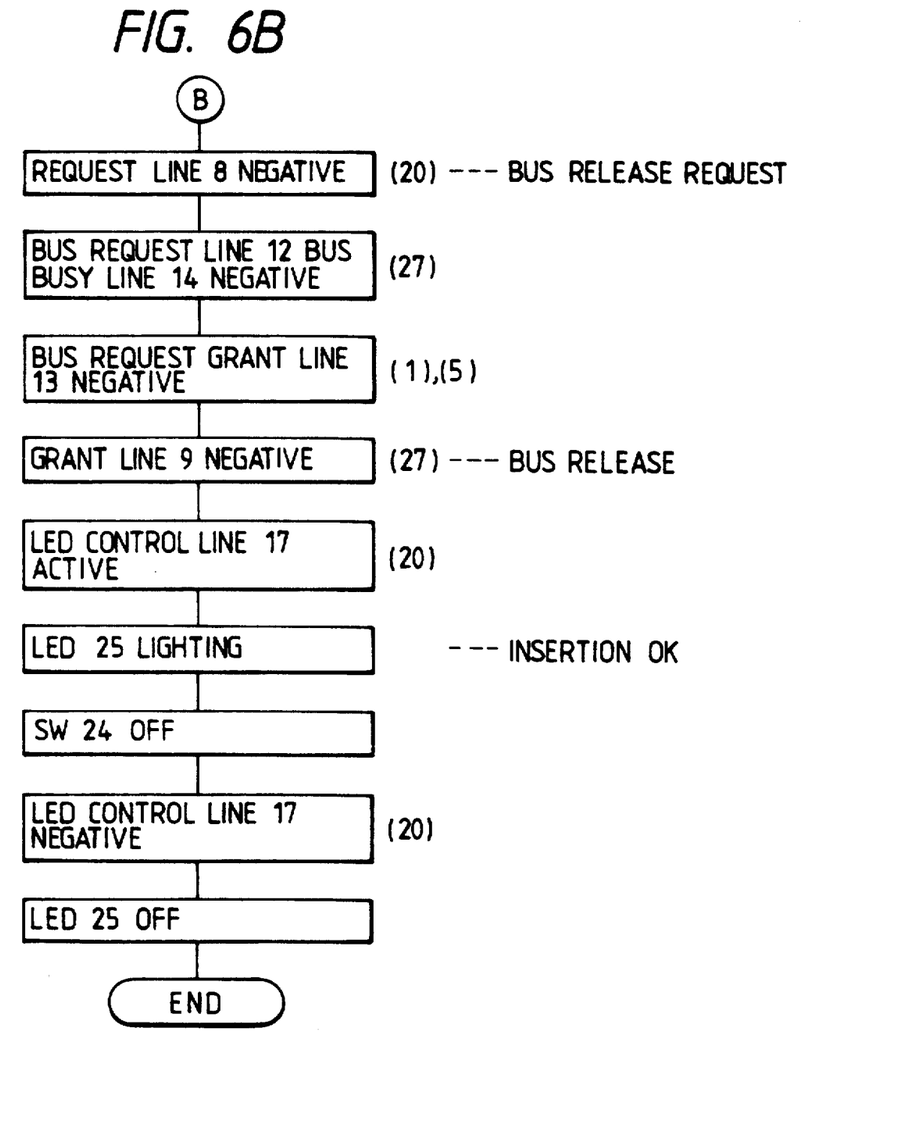

The above steps are shown in FIGS. 5a and 5b, in which the numerals indicate the component affected at any particular time.

On insertion of a new circuit component, the procedure is similar. The circuit device 2 is inserted with the switch 24 closed, and the switch 23 open. This physically connects the circuit board to the data bus. Then, the switch 23 is closed. This powers all parts of the circuit device 2 except the output driver 21 and data receiver 26. Once this happens, a signal is supplied via line 16 to the control device 20 by opening switch 24, causing that control device 20 to start the insertion activation procedure. The first stage is that a signal is sent via line 8, the access controller 27 and the line 12 to the control bus 4 and hence to the bus controller 1, to request that the newly inserted circuit device 2 be allowed to occupy the bus. On confirmation of this, a signal is sent from the bus controller 1 and is received on line 13, and an appropriate signal is sent via line 9 to the control device 20, generating a bus occupancy signal on line 19 and via the access controller 27 and line 14 to indicate to the other circuit devices that the bus network is occupied.

Once this has been completed, a signal is sent from the control device 20 via line 10 to close the relay 22 to power the output driver 21 and data receiver 26.

As before, the processing must then halt until the power to the output driver is stable, and again this may be for a predetermined time $t_1$ or by some suitable detection. Once that time has elapsed, the control device 20 sends a signal via line 8, which is transmitted via the access controller 27 and line 12 to the control bus 4, and hence to the bus controller 1, to signal that the newly inserted circuit device 2 no longer needs to occupy the network. At that time, the signals are removed from lines 12 and 14, and the return signal from the bus controller 1 received on line 13 signals to the control device 20 to activate the LED 25. On illumination of that LED, the insertion procedure is complete, switch 24 is closed, and the control device 20 then cuts off the power to the LED 25. Insertion is then complete.

Also illustrated in FIG. 2 is a reset input 18 from the control bus 4, which is used to reset all the components on insertion.

Figure 4:
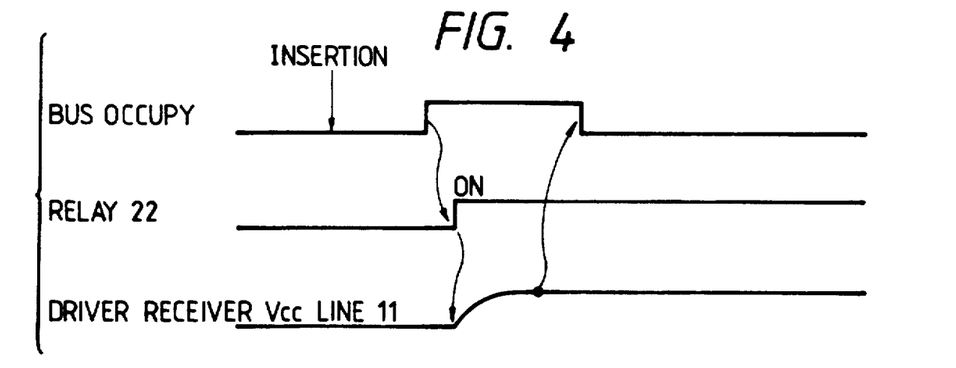
FIG. 4 shows the operation of that device during insertion.

FIGS. 3 and 4 illustrate how, during the unstable period of the output driver 21 and data receiver 26, a bus occupy signal is supplied.

Figure 7:
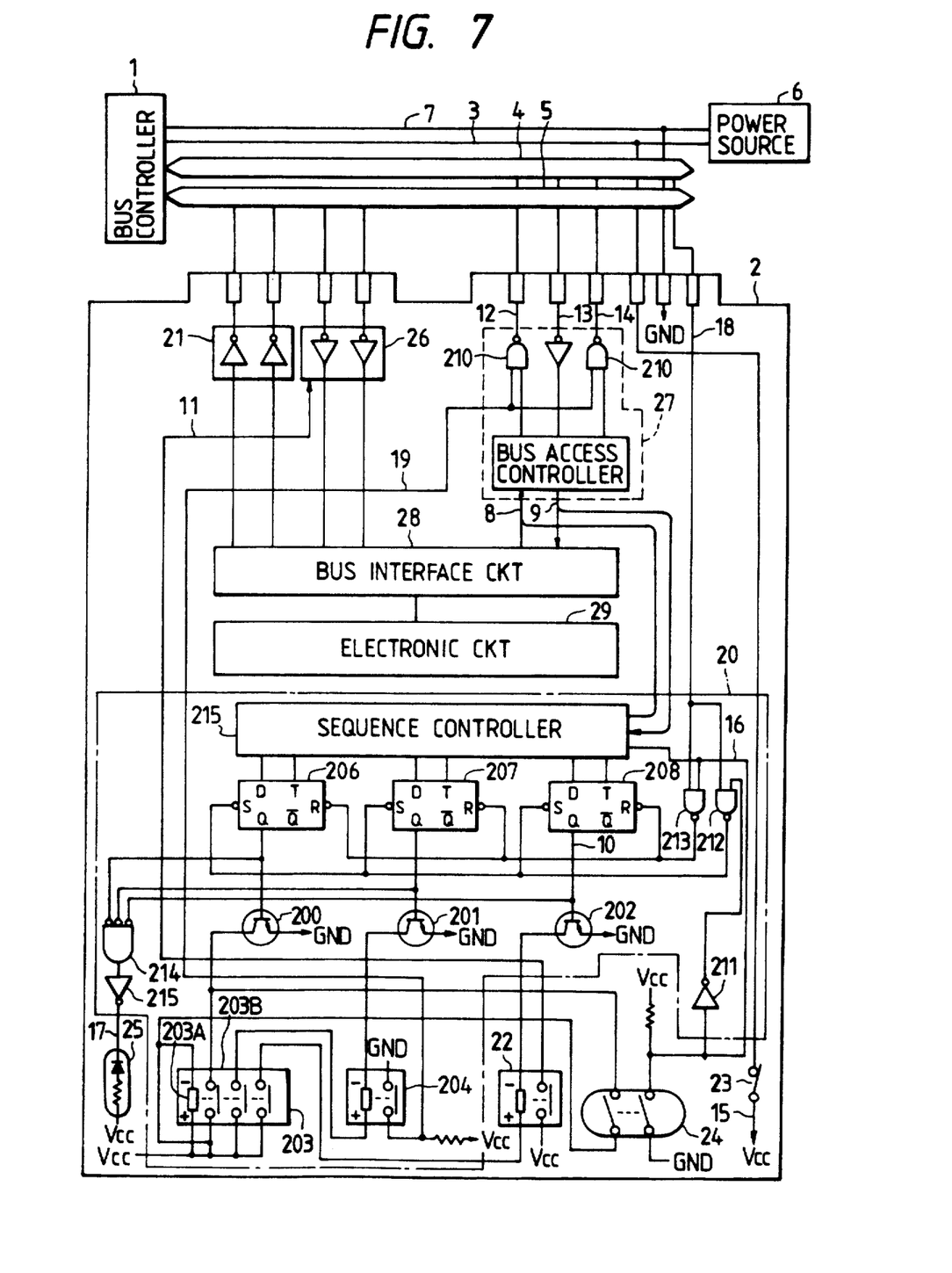
FIG. 7 is a more detailed circuit diagram of the device shown in FIG. 2.

FIG. 7, corresponds to FIG. 2, but shows the control device 20 in more detail. The parts of the circuit are the same as shown in FIG. 2. As shown in FIG. 7, the controller 20 comprises a sequence controller 25 which determines the timing of the operation of the controller 20, three flip-flops 206, 207, 208 connected to transistor switches 200, 201, 202 and also connected via a logic gate 214 and amplifier 215 to the LED 25.

The operation of the device of FIG. 7 will now be described, also referring to FIGS. 8 and 9 in which the various steps are shown.

Again, the removal operation will be described first. Some of the steps will, of course, correspond to the earlier description of the operation of FIG. 2, but for convenience will be repeated where appropriate.

Before the circuit device is removed, the relay 203 is activated and the transistors 200 to 202 are all turned on. Therefore, the contact point of the relay 204 is off and the contact point of the relay 22 is on. When the relay 203 is activated, a closed circuit for holding the relay 22 is formed via Vcc→coil 203A→contact point A 203B→transistor 200 even when the switch 24 is turned off, and the relay 203 maintains itself. The relay 203 is not excited when the power supply Vcc is interrupted or when the transistor 200 is turned off.

Figure 8:
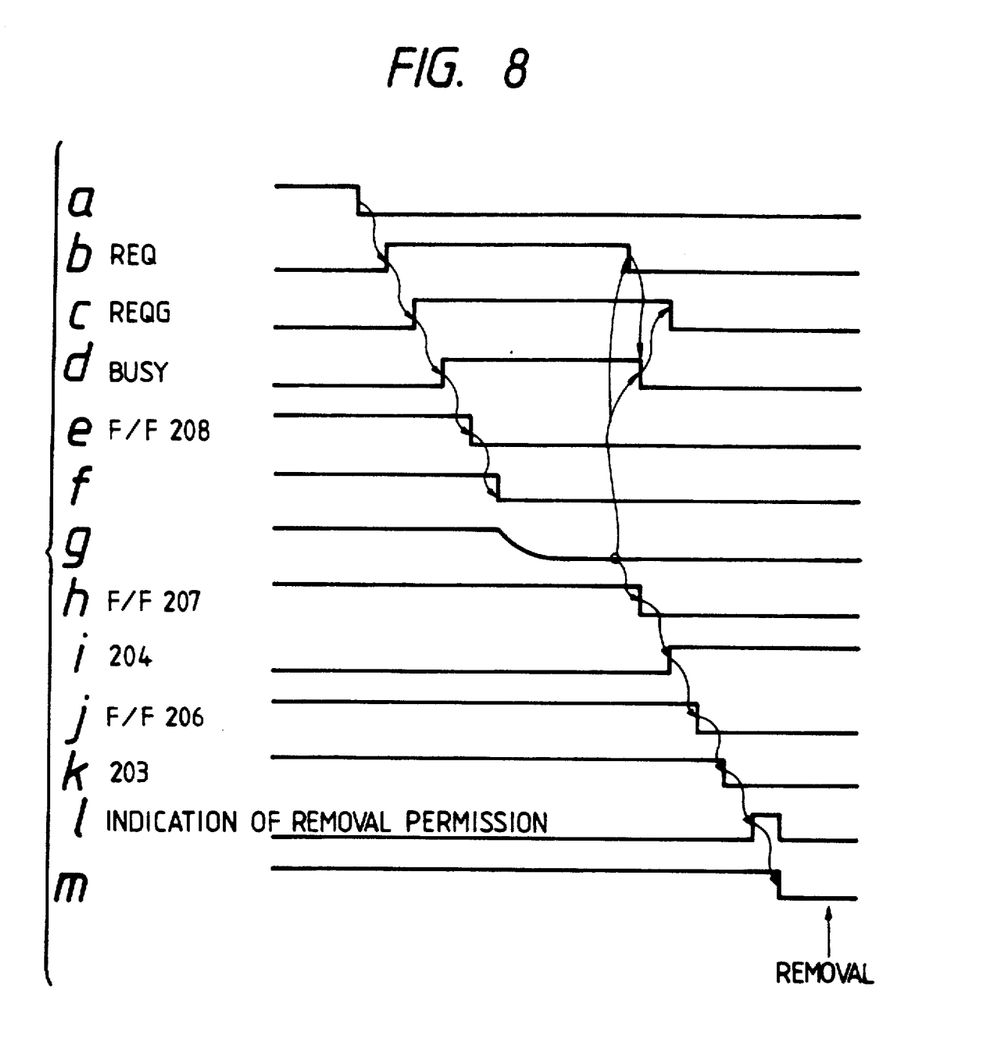
FIG. 8 shows in more detail the operation of the circuit device of FIG. 7, during removal of that device.
Figure 9:
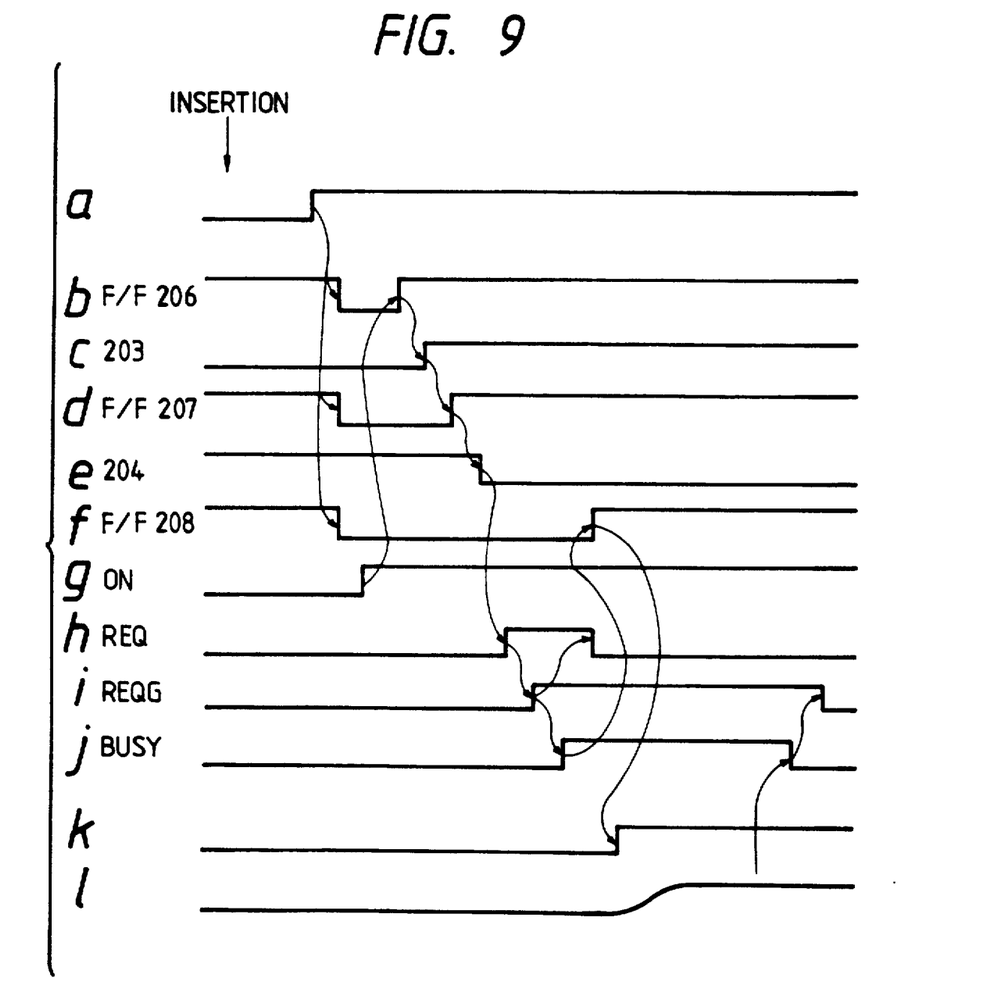
FIG. 9 shows in more detail the operation of the circuit device of FIG. 7 during insertion of that device.

At the time of removal the switch 24 is turned off, first (step (a) in FIG. 8). When the switch 24 is turned off, the output driver 21 generates a bus occupation request REQ which is sent to the bus controller 1 via bus 5 (step (b) in FIG. 8). When no other circuit board is producing a bus occupation request, the bus controller 1 sends a bus occupation permission (REQG) to the circuit device (step (c)). The circuit device 2 then sends a BUS BUSY signal to the bus 4 from the gate 210A that indicates the bus occupation (step (d)). Thus, the circuit device 2 is allowed to occupy the bus.

When the bus is occupied, the flip-flop 208 produces an output Q at the L level to turn the transistor 202 off (step (e)). The transistor 202 that is turned off causes the contact of the relay 22 to be turned off (step (f)) and the feed of power to the bus driver 21 is interrupted. With the feed of power being interrupted, the output driver 21 is powered down, with a slight delay in time. This is due to delay in mechanical operation of the relay 205, since it is an electromagnetic switch. The time is slightly delayed even when a transistor switch is used instead of the relay 205, and the same idea holds true. During this powering down, the output driver 21 is unstable (step (g)). After this unstable period, the gate 210A produces a BUS BUSY signal at the L level (step (h)).

Next, the flip-flop 207 produces an output Q at the L level to turn the transistor 201 off (step (i)). Therefore, the contact of the relay 204 is turned on to lock the driver 210 and the output of the gate 210A. Further, the flip-flop 206 produces the output Q at the L level to turn the transistor 200 off (step (j)). Accordingly, the relay 203 is not activated, and all the contacts of the relay 203 including the contact 203A are turned off (step (k)). Thus, the electric power is not fed to the relays 204, 205, nor to driver 210, or gate 210A of the access controller 27. The power feed switch 23 is then turned off. The feed of power to the circuit device 2 is now completely cut off, i.e., the circuit device 2 can be removed under the condition where the feed of power is completely stopped.

Insertion will now be described in conjunction with FIG. 9. The circuit device 2 is inserted after the switch 24 is turned off. After insertion, the power feed switch 23 is turned on (step (a)). Then, the flip-flops 206 to 208 produce outputs Q at the L level to turn the switch 209 on (step (b)). At this moment, since the flip-flop 206 produces an output Q at the L level, the transistor 200 is turned off and the relay 203 is not excited.

The flip-flop 206 then produces an output Q at the H level, and the relay 203 is excited to turn the contact points on (step (c)). Therefore, power Vcc is fed to the relays 204, 205, driver 210 for bus control signal, and to gate 210A.

Flip-flop 207 then produces an output Q at the H level (step (d)) to turn the transistor 201 on, to turn the contact B of the relay 204 off (step (e)), and to release the driver 210 for bus control signal and the gate 210A from the locked condition. Since the driver 210 and 210A are released from the locked condition, the circuit device 2 sends a bus occupation request REQ (step (h)) to the bus via driver 27. As for the case of removal, the circuit device 2 occupies the bus (generates BUSY signal, step (j)) under the condition where the bus is not occupied by any other circuit device.

After the bus is occupied, the flip-flop 208 produces an output Q at the H level (step (f)), whereby the transistor 202 is turned on and power is fed to the output driver 21 (step (k)); when the output driver 21 is stable (step (c)) the BUSY signal that indicates the condition of bus occupation is not produced (step (j)), and the insertion is completed.

According to the arrangement shown in FIG. 7, relays 203, 204 and 205 are used. However, it is also allowable to use electronic switches such as transistors in their place. This can be adapted to a system having a bus occupation monitoring time shorter than that of the relays.

Figure 10:
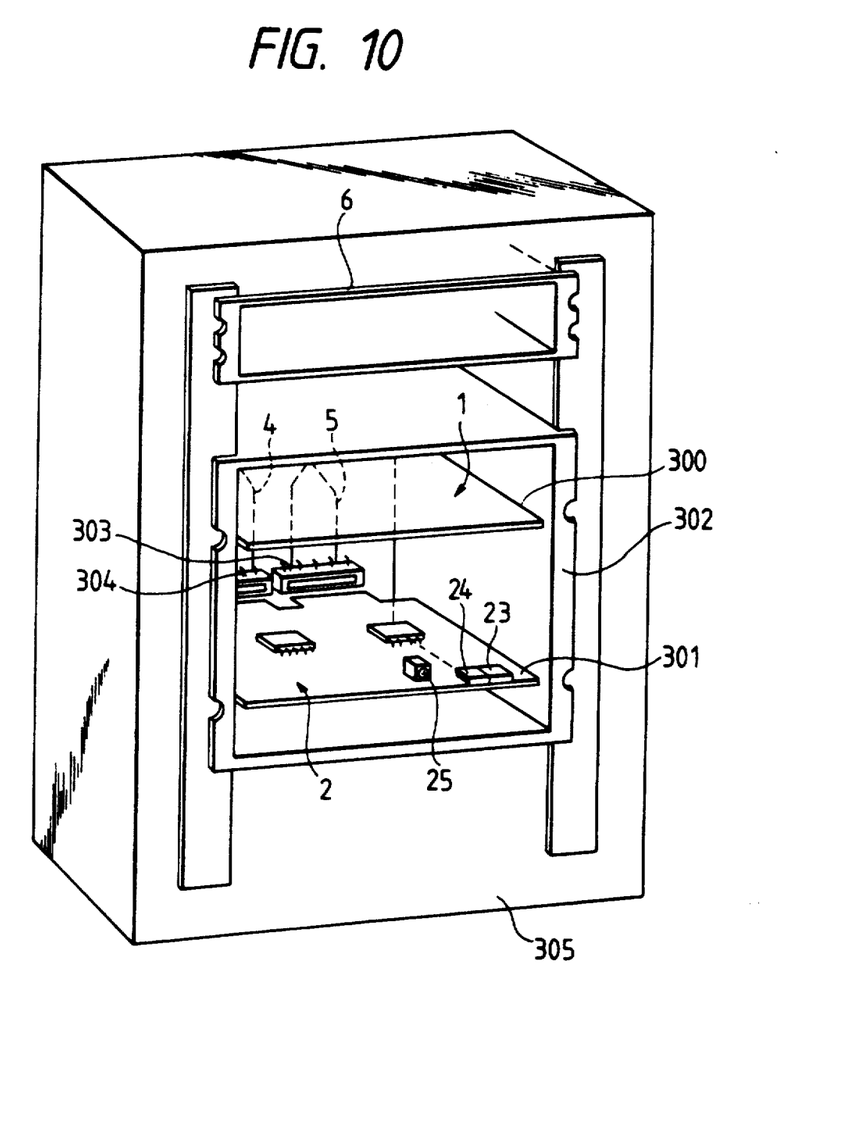
FIG. 10 shows a computer system incorporating a plurality of circuit devices each corresponding to that shown in FIG. 2.

Referring now to FIG. 10, the assembly of a plurality of output devices into a network corresponding to FIG. 1, and their mounting in a computer will be described. Referring to FIG. 10, a plurality of circuit boards 300, 301 are mounted in a frame 302. One of those circuit boards 300 may house the bus controller, and circuit board 300 illustrates a circuit board on which an output device 2 corresponding to the present invention is inserted, connected via suitable physical sockets 303, 304 to the bus network shown at 4 and 5. The frame 302 is mounted in a housing 305, which also contains the power supply 6. FIG. 10 also illustrates the two visible external switches 23, 24 of the circuit device 2, and the LED 25. Those switches 23, 24 form the user operated controls during removal and insertion as has been described above.

Thus, as has been described above, circuit devices can be inserted or removed from a powered network without affecting other circuit devices connected to that network. Maintenance of the system is rendered more simple, since a faulty board can be removed easily and a new board inserted. Power need not be interrupted during removal of a faulty board, so that the operation of a computer system incorporating such output devices need not be stopped, which also improves reliability. The circuit devices are normally mounted on a printed circuit board, for ease of handling.

What is claimed is:

1. A method of inserting a circuit device into an operating bus network having a plurality of powered circuit devices interconnected by a communication bus of said network, said method said comprising the steps of:
   connecting to said communication bus an output driver of a circuit device being inserted while said output driver is unpowered;
   supplying a signal on said communication bus from said circuit device being inserted to obtain for said circuit device being inserted the exclusive right to use of said communication bus;
   powering said output driver from a power supply after said circuit device being inserted has obtained exclusive use of the communication bus; and subsequently
   removing from said communication bus said signal supplied by said circuit device, thereby making said communication bus available to said plurality of powered circuit devices for obtaining use of the communication bus.

2. A method according to claim 1, wherein said bus network includes a signal bus interconnecting said powered circuit devices and said signal is applied to said signal bus.

3. A method according to claim 1, wherein said circuit device includes a control circuit for generating said signal, and said control circuit is connected to said network simultaneously with the connecting of said output driver to said network.

4. A method according to claim 1, wherein said circuit device includes a control circuit for generating said signal, and said control circuit is connected to said power supply prior to the generation of said signal.

5. A method according to claim 4 wherein said circuit device further includes a plurality of circuit components for connection to said communication bus via said output driver, and said plurality of circuit components are connected to said power supply simultaneously with said control circuit.

6. A method of removing a circuit device from an operating bus network in which a plurality of powered circuit devices and said circuit device to be removed are interconnected by a communication bus of said network, said method comprising the steps of:
   supplying a signal on said communication bus from said circuit device to be removed to obtain for said circuit device to be removed the exclusive right to use of said communication bus;
   removing the power from an output driver of said circuit device to be removed, which output driver is connected to said communication bus; subsequently
   removing said signal being supplied to said communication bus from said circuit device to be removed; and then
   disconnecting said output driver from said communication bus.

7. A method according to claim 6, wherein said bus network includes a signal bus interconnecting said powered circuit devices, said signal being applied to said signal bus.

8. A method according to claim 6, wherein said circuit device includes a control circuit for generating said signal, and said control circuit is disconnected from said network simultaneously with the disconnecting of said output driver.

9. A method according to claim 6, wherein said circuit device includes a control circuit for generating said control signal, and said control circuit is disconnected from said power supply subsequent to the removing of said signal.

10. A method according to claim 9, wherein said circuit device further includes a plurality of circuit components connected to said communication bus via said output driver, and said plurality of circuit components are disconnected from said power supply simultaneously with said disconnecting of said control circuit.

11. A method of inserting a circuit device into an operating bus network having a plurality of powered circuit devices interconnected by a communication bus of said network, said method comprising the steps of:
   connecting said circuit device to said network;
   supplying a signal from said circuit device to said communication bus for a predetermined period to obtain for said circuit device being inserted the exclusive right to use of said communication bus; and powering an output driver of said circuit device during said predetermined period.

12. A method of removing a circuit device from said bus network in which a plurality of powered circuit devices and said circuit device to be removed are interconnected by a communication bus of said network, said method comprising the steps of:
supplying a signal from said circuit device to said communication bus for a predetermined period to obtain for said circuit device being inserted the exclusive right to use of said communication bus; and
disconnecting an output driver of said circuit device from power during said predetermined period.

13. A method of inserting an additional circuit device into a bus network in which a plurality of powered circuit devices are already interconnected by a communication bus of said network, said method comprising the steps of:
connecting said circuit device to said communication bus in said network;
during said connecting, generating a signal on said bus from said additional circuit device to obtain for said circuit device being inserted the exclusive right to use said communication bus; and thereafter
supplying power to an output driver of said additional circuit device and maintaining said signal on said communication bus at least until the powering of said output driver is stabilised.

14. A method of removing a powered circuit device from a bus network having a plurality of powered circuit devices interconnected by a communication bus of said network, said method comprising the steps of:
generating on said communication bus, from said circuit device to be removed from said network, a signal to obtain for said circuit device being inserted the exclusive right to use said communication bus;
discontinuing the supply of power to an output driver of said circuit device to be removed while maintaining said signal on said communication bus until the removal of power from said output driver is stabilised; and
disconnecting said circuit device to be removed.

15. A circuit network having a plurality of first circuit devices, a bus network including a communication bus interconnecting said first circuit devices, and a second circuit device for connection to said bus network, said second circuit device comprising:
an output driver for connection to said communication bus;
connection means for selectively connecting said output driver to a power source; and
a control circuit for connection to said bus network and for controlling said connection means, including means for generating a first signal to said network for obtaining for said second circuit device the exclusive right to use said communication bus and for subsequently generating a second signal after said second circuit device has been granted exclusive right to use said communication bus for causing said connection means to connect said output driver to said power source.

16. A circuit network according to claim 15, wherein said second circuit device further includes a plurality of circuit components for connection to said communication bus via said output driver, and further connection means for connecting said control circuit and said plurality of circuit components to said power supply.

17. A circuit network according to claim 15, wherein said second circuit device includes a printed circuit board.

18. A circuit network having a plurality of circuit devices and a bus network including a communication bus interconnecting said circuit devices, wherein at least one of said circuit devices is arranged to be removed from said network;
said at least one circuit device comprising:
an output driver connected to said communication bus;
a connection means for selectively connecting said output driver to a power source; and
a control circuit connected to said network for controlling said connecting means, and including means for generating a first signal to said network for obtaining for said at least one circuit device an exclusive right of use of said communication bus and for subsequently generating a second signal after said at least one circuit device has been granted exclusive right of use of said communication bus for causing said connection means to disconnect said output driver from said power source.

19. A circuit network according to claim 18, wherein said network includes a control bus interconnecting said circuit devices, and said control circuit is connected to said control bus.

20. A circuit network according to claim 18, wherein said at least one circuit device further includes a plurality of circuit components connected to said communication bus via said output driver, and further connection means connecting said control circuit and said plurality of circuit components to said power supply.

21. A circuit network according to claim 18, wherein said at least one circuit device includes a printed circuit board.

22. A circuit network having a plurality of first circuit devices, a bus network including a communication bus interconnecting said first circuit devices, and a second circuit device for connection to said bus network, said second circuit device comprising:
an output driver for connection to said communication bus;
connection means for selectively connecting said output driver to a power source; and
means for controlling said connection means to connect said output driver to said power source only during a time when said second circuit device has been granted exclusive right to use of said communication bus.

23. A circuit network having a plurality of circuit devices and a bus network including a communication bus interconnecting said circuit devices, wherein at least one of said circuit devices is arranged to be removed from said network;
said at least one circuit device comprising:
an output driver connected to said communication bus;
connection means connecting said output driver to a power source; and
means for controlling said connection means to disconnect said output driver from said power source only during a time when said at least one circuit device has been granted exclusive right to use of said communication bus.

24. A method of maintaining a circuit network having a plurality of powered circuit devices, including a faulty circuit device, and a bus network including a communication bus interconnecting said circuit devices, said method comprising the steps of:

granting to said faulty circuit device an exclusive right to use of said communication bus while maintaining the supply of power to other powered circuit devices;

removing said faulty circuit device after said faulty circuit device has been granted exclusive right to use said communication bus;

connecting a new circuit device to said bus network to replace said faulty circuit device;

powering said new circuit device; and thereafter permitting one of said powered circuit devices and said new circuit device to obtain the exclusive right of use of said communication bus.

25. A method according to claim 24, wherein, after removing said faulty circuit device, said powered circuit devices are permitted to signal on said communication bus and, prior to said connecting of said new circuit device, said powered circuits are again prevented from signalling on said communication bus.

26. A circuit device for connection to a bus network including a communication bus, comprising:

an output driver;

a plurality of circuit components for connection to said bus network via said output driver;

a control circuit;

first switching means for connecting said plurality of circuit components and said control circuit to a power supply; and second switching means controllable by said control circuit for selectively connecting said output driver to said power supply;

wherein activation of said first switching means operates to activate said control circuit, and said control circuit includes means for activating said second switching means automatically in response to a signal from said bus network indicating that said circuit device has been granted exclusive right of use of said communication bus thereby to activate said output driver.

27. A circuit device for connection to and removal from a bus network, comprising:

a plurality of circuit components;

an output driver for connecting said circuit components to said network;

a first user operable switch for generating a removal signal;

a control circuit responsive to said removal signal for disconnecting said output driver from a power supply;

display means for indicating the completion of said disconnecting of said output driver from said power supply; and a second user operable switch for disconnecting said control circuit and said plurality of circuit components from said power supply.

28. A computer system, comprising:

a bus network including a communication bus;

a bus controller connected to said bus network; and a plurality of circuit devices connected to said network and arranged to signal on said communication bus under control of said bus controller, each of said circuit devices including an output driver and a plurality of other components;

wherein at least some of said plurality of circuit devices include means for generating a first signal to said bus controller to obtain for a circuit device generating said first signal an exclusive right of use of said communication bus, and said bus controller includes means for generating a second signal in response to said first signal for granting to said circuit device which generated the first signal the exclusive right of use of said communication bus; and means responsive to said second signal for causing the output driver of the circuit device generating said first signal to be disconnected from a power supply without disconnection of the other components thereof from said power supply.

* * * * *